United States Patent
Yeom et al.

(10) Patent No.: US 11,738,773 B2
(45) Date of Patent: Aug. 29, 2023

(54) SYSTEM FOR CONTROLLING AUTONOMOUS VEHICLE FOR REDUCING MOTION SICKNESS

(71) Applicants: Hyundai Motor Company, Seoul (KR); Kia Motors Corporation, Seoul (KR)

(72) Inventors: Myung-Ki Yeom, Incheon (KR); In-Su Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 149 days.

(21) Appl. No.: 17/025,317

(22) Filed: Sep. 18, 2020

(65) Prior Publication Data

US 2022/0001894 A1   Jan. 6, 2022

(30) Foreign Application Priority Data

Jul. 2, 2020   (KR) ........................ 10-2020-0081340

(51) Int. Cl.
*B60W 60/00* (2020.01)
*B60W 40/08* (2012.01)
*B60W 30/14* (2006.01)

(52) U.S. Cl.
CPC ...... *B60W 60/0013* (2020.02); *B60W 30/143* (2013.01); *B60W 40/08* (2013.01); *B60W 2040/0872* (2013.01); *B60W 2540/22* (2013.01); *B60W 2540/221* (2020.02)

(58) Field of Classification Search
CPC ........... B60W 60/0013; B60W 30/143; B60W 40/08; B60W 2040/0872; B60W 2540/22; B60W 2540/221; B60W 2050/0028; B60W 2520/105; B60W 2520/125; B60W 2520/14; B60W 2540/227; B60W 40/10;
(Continued)

(56) References Cited

U.S. PATENT DOCUMENTS

2017/0136842 A1* 5/2017 Anderson ............ B60N 2/0244
2019/0022347 A1* 1/2019 Wan ......................... A61B 5/18
2020/0125989 A1* 4/2020 Sucan ................... B60W 40/09
(Continued)

FOREIGN PATENT DOCUMENTS

KR   10-2018-0123697 A   11/2018
KR   10-2019-0126198 A   11/2019

*Primary Examiner* — Nadeem Odeh
(74) *Attorney, Agent, or Firm* — Fox Rothschild LLP

(57) ABSTRACT

A system for controlling an autonomous vehicle is capable of predicting and eliminating a possibility of motion sickness before and during travelling of the autonomous vehicle. The system includes: a first control unit which compares a first vehicle motion sickness index that is determined by a travelling simulation with a first threshold set including passenger information before travelling and controls a boarding location of a passenger before travelling; and a second control unit which computes a passenger motion sickness index from passenger state information and vehicle state information detected during travelling, compares a second threshold indicating the degree of sensitivity to motion sickness according to passenger information during travelling with the passenger motion sickness index, and controls the autonomous vehicle so as to reduce or eliminate a generation of a motion sickness causing frequency.

7 Claims, 7 Drawing Sheets

(58) Field of Classification Search
CPC ......... B60W 50/0097; B60W 60/0011; B60W 2040/0881; B60W 2520/10
See application file for complete search history.

(56) References Cited

U.S. PATENT DOCUMENTS

| | | |
|---|---|---|
| 2021/0031789 A1* | 2/2021 | Moriura ................ A61B 5/1114 |
| 2021/0154430 A1* | 5/2021 | Lev ........................ G16H 40/67 |
| 2021/0164796 A1* | 6/2021 | Larner ................. G05D 1/0088 |
| 2022/0001893 A1* | 1/2022 | Tartz .................. B60W 30/025 |
| 2022/0135054 A1* | 5/2022 | Nakamura ............ B60W 40/09 |
| | | 701/1 |

* cited by examiner

SYSTEM FOR CONTROLLING AUTONOMOUS VEHICLE FOR REDUCING MOTION SICKNESS

CROSS-REFERENCE TO RELATED APPLICATIONS

This application claims under 35 U.S.C. § 119 the benefit of Korean Patent Application No. 10-2020-0081340, filed on Jul. 2, 2020 in the Korean Intellectual Property Office, the entire contents of which are incorporated herein by reference.

BACKGROUND

1. Technical Field

The present disclosure relates to a system for controlling an autonomous vehicle for reducing motion sickness, more particularly, to the control system which is capable of predicting and eliminating an occurrence of motion sickness before and during travelling of the autonomous vehicle.

2. Description of the Related Art

An autonomous vehicle is a vehicle that can autonomously drive by recognizing surrounding conditions and vehicle conditions, without user intervention, to a predetermined destination. Accordingly, a passenger who rides in an autonomous vehicle is capable of performing various non-driving tasks, such as reading a book or using a smartphone in the vehicle. However, such behavior may cause motion sickness to passengers in the autonomous vehicle.

Motion sickness including dizziness, vomiting, and the like when a passenger rides in a vehicle is caused by the brain causing temporary confusion when there is a mismatch in input between sensory organs (visual, vestibular organs, and the like) that maintain balance or sense movement and posture.

Typically, a person's brain can remember the reactions of sensory organs, such as the eyes and ears, to the movements of the muscles in the head, and when similar movements occur later, the sensory organs make a prediction, prepare, and react in response to the similar movement with the stored information. However, in a state of riding in a vehicle, there is little or no movement of muscles that can be retrieved from existing memories, so that there may be a mismatch of sensation, resulting in motion sickness.

Motion sickness is also related to amplitude or frequency of shaking of a vehicle. Vibration of the vehicle causing motion sickness is generated by exposure to low-frequency vibration or very low or high acceleration unfamiliar to the passenger. Reportedly, the frequency causing motion sickness is around 0.2 Hz.

In the meantime, various technologies for preventing motion sickness caused to passengers in a vehicle are disclosed.

Korean Patent Application Laid-Open No. 10-2019-0126198 (Method and System for Determining and Dynamically Updating Route and Driving Style for Passenger Comfort) discloses a method, which, when a user experiences motion sickness symptoms while a vehicle travels in a first route, enables the vehicle to be operated according to a second route so as to prevent motion sickness based on a motion sickness value determined by an input of the user.

However, in Korean Patent Application Laid-Open No. 10-2019-0126198, when motion sickness occurs while a vehicle travels in a first route, a user needs to manually input the occurrence of the motion sickness and change the route, so that it is inconvenient for the user to manually manipulate the system and a response time to the occurrence of the motion sickness is long.

Korean Patent Application Laid-Open No. 10-2018-0123697 (Universal Motion Sickness Response System) includes an optical array system which visually stimulates the user's view, and a controller which controls to activate the optical array system by imitating a visual input received when the user gazes outside of a transportation means, to change an activation order of the optical array according to the movement of the transportation means and stimulate the user's view, thereby promoting the prevention of motion sickness.

Korean Patent Application Laid-Open No. 10-2018-0123697 has a problem of uniformly stimulating the passenger's vision according to the movement of the transportation means without considering the level of sensitivity of the motion sickness felt by the passenger.

SUMMARY

The present disclosure is directed to predicting an actual occurrence of motion sickness in consideration of a degree of sensitivity of an occurrence of the motion sickness that is different depending on each passenger before and during travelling, so as to rapidly eliminate the occurrence of motion sickness.

An exemplary embodiment of the present disclosure provides a system for controlling an autonomous vehicle for reducing motion sickness, the system including: a first control unit which estimates a first vehicle motion sickness index that is determined by a travelling simulation of the vehicle performed with an analyzed target route before travelling, compares a first threshold indicating a degree of sensitivity to motion sickness according to passenger information before travelling with the first vehicle motion sickness index, and controls a boarding location of a passenger before travelling; and a second control unit which computes a passenger motion sickness index from passenger state information and vehicle state information detected during travelling, compares a second threshold indicating the degree of sensitivity to motion sickness according to passenger information during travelling with the passenger motion sickness index, and controls a behavior of the travelling vehicle so as to reduce or eliminate a generation of a motion sickness causing frequency.

The present disclosure has the following effects.

First, motion sickness is controlled twice before and during travelling of a vehicle, thereby minimizing occurrence of motion sickness.

Secondly, a passenger state is considered as well as a vehicle state which may cause motion sickness during travelling, so that the degree of sensitivity to motion sickness which is different for each passenger is reflected to a passenger motion sickness index.

Thirdly, information on a passenger is stored remotely (e.g., in the cloud), so that passenger information may be used even in a different vehicle when the passenger changes the vehicle.

DETAILED DESCRIPTION OF THE EMBODIMENTS

Figure 1:
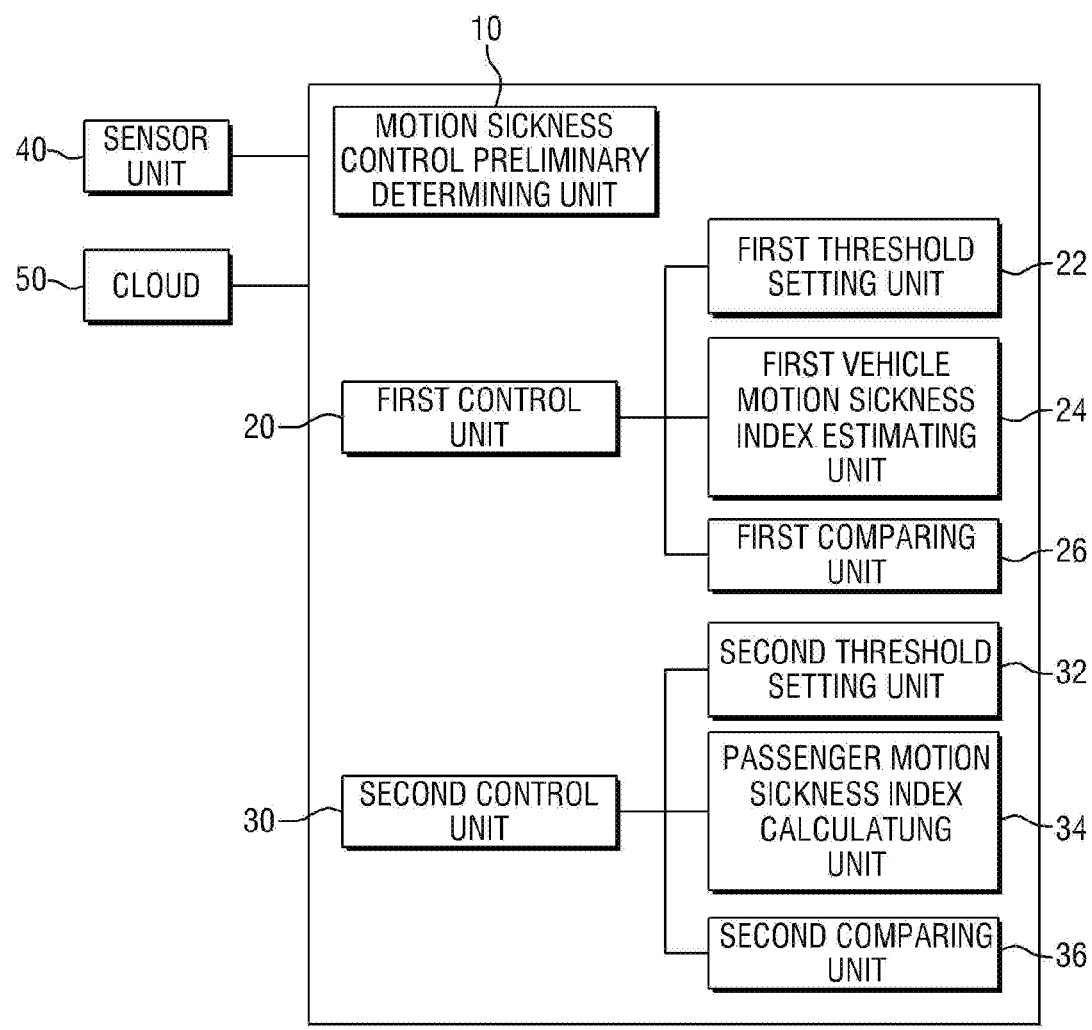
FIG. 1 is a diagram illustrating a schematic configuration of a system for controlling an autonomous vehicle for reducing motion sickness according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of a system for controlling an autonomous vehicle for reducing motion sickness according to the present disclosure will be described in detail with reference to the drawings. Terms or words used below shall not be interpreted to be limited as general or lexical meanings, and on the principle that the inventor can appropriately define a concept of a term for describing the disclosure by the best method, the terms or the words shall be interpreted as a meaning and a concept corresponding to the technical spirit of the present disclosure.

FIG. 1 is a diagram illustrating a schematic configuration of a system for controlling an autonomous vehicle for reducing motion sickness according to an exemplary embodiment of the present disclosure.

Referring to FIG. 1, a system for controlling an autonomous vehicle for reducing motion sickness according to an exemplary embodiment of the present disclosure is capable of controlling motion sickness before and during travelling, and includes a motion sickness control preliminary determining unit 10, a first control unit 20, and a second control unit 30.

The motion sickness control preliminary determining unit 10 determines whether to control motion sickness before travelling in advance, and recognizes information about a passenger before travelling. The information about the passenger before travelling includes all information, such as personal information, such as the gender, age, and race of a passenger, a seat position and seat angle where a passenger will sit, and information on a posture of a passenger, based on which a passenger is recognizable, and is collected by a sensor unit 40.

The sensor unit 40 includes sensors of the vehicle, such as various sensors detecting environments inside and outside the vehicle, a surrounding CCTV, a smart device and a wearable device carried by a passenger, and a door switch button part of the vehicle, which are capable of recognizing information about a passenger and information on behavior of the vehicle. The information about the passenger collected by the sensor unit 40 is stored remotely, e.g., in a "cloud" 50. The cloud 50 is capable of performing transmission/reception with the vehicle through wireless network communication.

When there is a passenger of which passenger information is not recognized, the motion sickness control preliminary determining unit 10 classifies the passenger into an unknown person and additionally checks passenger information about the unknown person by using the sensor unit 40 or the cloud 50. The case where the passenger information about the passenger classified into the unknown person is recognized later is, for example, the case where the passenger takes off the worn hat or mask during boarding, and the case where a power supply of a smart device carried by the passenger is turned on after the turn-off. When the passenger information of the unknown person is not checked, the motion sickness control preliminary determining unit 10 may not control the motion sickness before the travelling.

After the passenger information is recognized, the motion sickness control preliminary determining unit 10 determines whether it is possible to control motion sickness before travelling. The case where it is impossible to control motion sickness before travelling is the case where it is not necessary to control motion sickness, for example, the case where a travelling mode of the vehicle is a sport mode, the case where one passenger in the autonomous vehicle switches the travelling mode from an autonomous driving mode to a driver authority mode.

The first control unit 20 is provided for the purpose of controlling motion sickness before travelling, and includes a first threshold setting unit 22, a first vehicle motion sickness index estimating unit 24, and a first comparing unit 26.

The first threshold setting unit 22 sets a first threshold indicating the level of sensitivity to the occurrence of the motion sickness of a passenger according to the passenger information before travelling. The first threshold is a value predicted to cause motion sickness to the passenger before travelling, and is stored in the cloud 50 through previous driving information of the passenger or a vehicle test.

Even though the same motion sickness causing frequency is generated in the vehicle, the degree of motion sickness occurrence prediction is different according to the passenger information before travelling. For example, in general, women are more susceptible to motion sickness than men, and Asians may be more susceptible to motion sickness than non-Asians. Further, the passenger information may also include information on whether a vehicle movement is predictable through information on a posture of the passenger. Herein, when the posture of the passenger is the posture based on which a vehicle movement cannot be predicted, the posture is more susceptible to motion sickness. Accordingly, when the degree of the motion sickness occurrence prediction is low, the first threshold may be set to be large, and when the degree of the motion sickness occurrence prediction is high, the first threshold may be set to be small.

The first threshold setting unit 22 computes thresholds drawn based on the passenger information before travelling and sets the first threshold. For example, the first threshold setting unit 22 may set the first threshold by multiplying a first-one threshold according to the gender, a first-two threshold according to the age, and a first-n threshold according to other passenger information before travelling or computing them by another method.

The first vehicle motion sickness index estimating unit 24 receives information on a route (hereinafter, referred to as a "target route") from a departure point to a destination before travelling, through a navigation system and the like, performs a travelling simulation according to the target route by using a simulator, and estimates a first vehicle motion sickness index. However, in another exemplary embodiment of the present disclosure, the first vehicle motion sickness index estimating unit 24 may estimate a first vehicle motion sickness index based on previous travelling information on the actual movement of the target route by the vehicle. Herein, the first vehicle motion sickness index is defined as motion sickness causing energy generated by behavior of the vehicle while the simulation travelling is performed.

Figure 2:
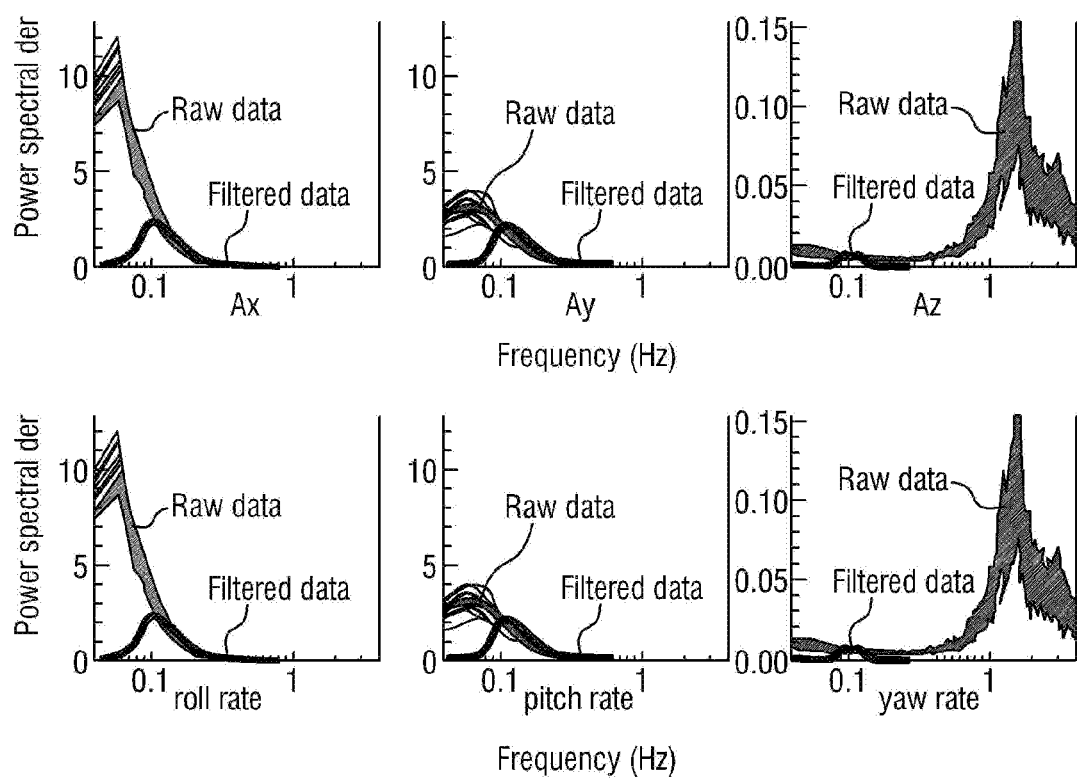
FIG. 2 is a diagram illustrating vehicle data according to the exemplary embodiment of the present disclosure.

FIG. 2 is a diagram illustrating vehicle data according to the exemplary embodiment of the present disclosure.

The first vehicle motion sickness index estimating unit 24 collects and analyzes vehicle data measured while the travelling simulation is performed. Referring to FIG. 2, the measured vehicle data is raw data, and includes translational motion data (ax) in an X-axis direction of the vehicle (a front-rear direction of the vehicle), translational motion data (ay) in a Y-axis direction of the vehicle (a width direction of the vehicle), translational motion data (az) in a Z-axis direction of the vehicle (a height direction of the vehicle), rotational motion data (roll rate) around the X-axis of the vehicle, rotational motion data (pitch rate) around the Y-axis of the vehicle, and rotational motion data (yaw rate) around the Z-axis of the vehicle.

The first vehicle motion sickness index estimating unit 24 filters at least one of the measured vehicle data items and extracts data of a frequency band which is predicted to cause motion sickness. In FIG. 2, raw data and filtered data are illustrated in each vehicle data item.

The first vehicle motion sickness index estimating unit 24 performs a Fast Fourier Transform (FFT) computation by using the filtered data extracted from each vehicle data item, and calculates energy of each vehicle data item. A formula for calculating energy of each vehicle data item is as follows.

$$E_x = \int_{f_1}^{f_2} |X(f)|^2 df \qquad \text{<Calculation Formula>}$$

Herein, $E_x$ means energy of each vehicle data item ($E_{ax}$, $E_{ay}$, $E_{az}$, $E_{roll}$, $E_{pitch}$, and $E_{yaw}$), a frequency band from $f_1$ to $f_2$ is a band including a motion sickness causing frequency, and x(f) means a frequency signal of each vehicle data item.

However, in another exemplary embodiment of the present disclosure, energy of each vehicle data item may be calculated by Parseval's theorem in a time domain, not a frequency domain.

The first vehicle motion sickness index estimating unit 24 obtains total energy by summing all of the energy calculated in the respective vehicle data items. The total energy computed by the foregoing process is defined as the first vehicle motion sickness index in the present specification. In another exemplary embodiment of the present disclosure, an average value of the energy calculated in the respective vehicle data items may be defined as the first vehicle motion sickness index.

In the meantime, the simulator, each vehicle data item, and the like used in the travelling simulation may be stored in a memory unit (not illustrated) provided in the vehicle or the cloud 50.

The first comparing unit 26 compares the first vehicle motion sickness index with the first threshold and generates a signal so as to control a boarding location of the passenger before travelling. When the first vehicle motion sickness index is smaller than the first threshold, the occurrence of the motion sickness is not predicted, so that it is not necessary to control the location of the passenger. In contrast, when the first vehicle motion sickness index is larger than the first threshold, the occurrence of the motion sickness is predicted, so that the first comparing unit 26 generates a guide signal so as to induce forward boarding for a passenger boarding in a reverse direction.

The second control unit 30 is for the purpose of controlling motion sickness during travelling, and includes a second threshold setting unit 32, a passenger motion sickness index calculating unit 34, and a second comparing unit 36.

The second threshold setting unit 32 sets a second threshold indicating the degree of sensitivity to the occurrence of the motion sickness of the passenger according to the passenger information during the travelling. Herein, the passenger information during the travelling may include the passenger information before the travelling. The second threshold is a value predicted to cause motion sickness to the passenger during the travelling, and may be the same as or different from the first threshold. That is, when the passenger information before the travelling does not match the passenger information during the travelling, the first threshold is different from the second threshold. For example, the posture of the passenger before the travelling is the posture based on which the movement of the vehicle is predictable, but when the passenger changes his/her posture to the posture based on which the movement of the vehicle is not predictable during the travelling, the first threshold is different from the second threshold.

In the meantime, the method of setting the second threshold is the same as the method of setting the first threshold.

The passenger motion sickness index calculating unit 34 calculates a passenger state index and a second vehicle motion sickness index, and then calculates a passenger motion sickness index indicating the degree of the occurrence of the motion sickness of the passenger.

Figure 3:
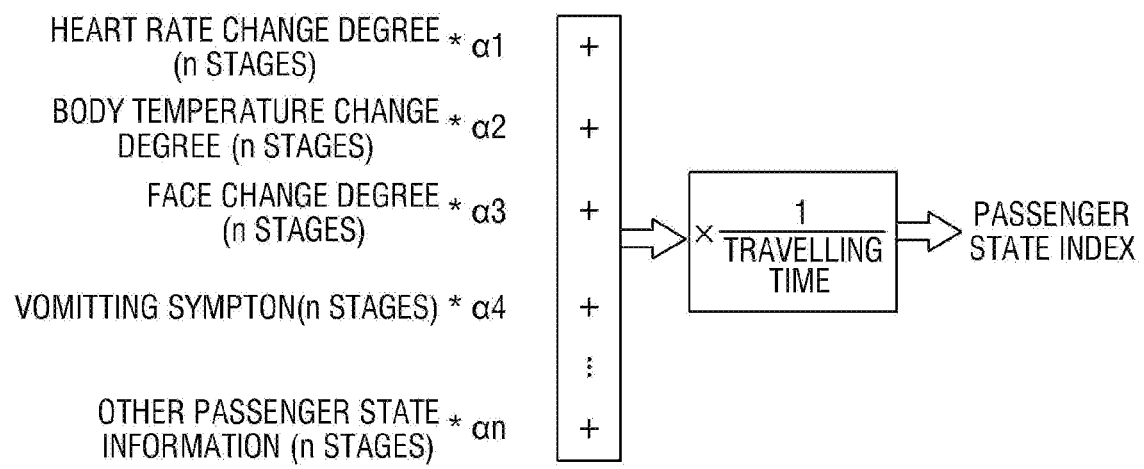
FIG. 3 is a diagram illustrating a passenger state index according to the exemplary embodiment of the present disclosure.

FIG. 3 is a diagram illustrating a passenger state index according to the exemplary embodiment of the present disclosure.

A passenger state index is calculated based on passenger state information. The passenger state information means information about a body of the passenger changed for the travelling time up to a present time. For example, the passenger state information includes information on changes in a heart rate, body temperature, and facial expression of the passenger collected through the sensor unit 40 for the travelling time up to the present time, information about an actual vomiting symptom, and the like.

Referring to FIG. 3, when the number of passenger state information is plural, the degree of contribution to the occurrence of the motion sickness needs to be considered in each passenger state information in order to calculate the passenger state index. In each passenger state information, the degree of body change (the degree of occurrence of the motion sickness) may be divided into n stages and set in advance, and each stage is measured through the sensor unit 40. Further, the degree of contribution of each passenger state information to the occurrence of the motion sickness is different, so that a weighted value (al to cm) is assigned to each passenger state information. The passenger state index is computed by summing the degree of the occurrence of the motion sickness and each passenger state information to which the weighted value is assigned, and then dividing the summed value by a travelling time up to the present time.

The second vehicle motion sickness index is calculated based on vehicle state information. The vehicle state information means information on a behavior of the vehicle changed for the travelling time up to the present time. Herein, the information on the behavior of the vehicle is vehicle data actually measured by the sensor unit 40 while the vehicle travels for the travelling time up to the present time. Herein, the second vehicle motion sickness index is defined as motion sickness causing energy generated by the behavior of the vehicle for the travelling time up to the present time. The process of calculating the second vehicle motion sickness index is the same as the process of estimating the first vehicle motion sickness index, so that detailed contents thereof will be omitted.

The passenger motion sickness index calculating unit 34 calculates a passenger motion sickness index by computing the calculated passenger state index and the second vehicle motion sickness index. By drawing the passenger motion sickness index, the degree of occurrence of the motion sickness of the passenger during the travelling may be digitized in consideration both the state of the passenger and the behavior state of the vehicle.

In the meantime, the first threshold and the second threshold may be stored in the memory unit (not illustrated) provided in the vehicle or the cloud 50.

The second comparing unit 36 compares the second vehicle motion sickness index with the second threshold and generates a signal for controlling the behavior of the vehicle during the travelling. When the second vehicle motion sickness index is smaller than the second threshold, the motion sickness does not occur, so that it is not necessary to control the behavior of the vehicle. In contrast, when the second vehicle motion sickness index is larger than the second threshold, the motion sickness occurs, so that it is necessary to control the behavior of the vehicle.

In the meantime, the control of the behavior of the vehicle means adjusting the speed, a direction, and the like of the vehicle to control the vehicle to reduce or eliminate the occurrence of the frequency causing the motion sickness. However, the exemplary embodiment of the present disclosure will be described based on the adjustment of the speed of the vehicle.

Figure 4:
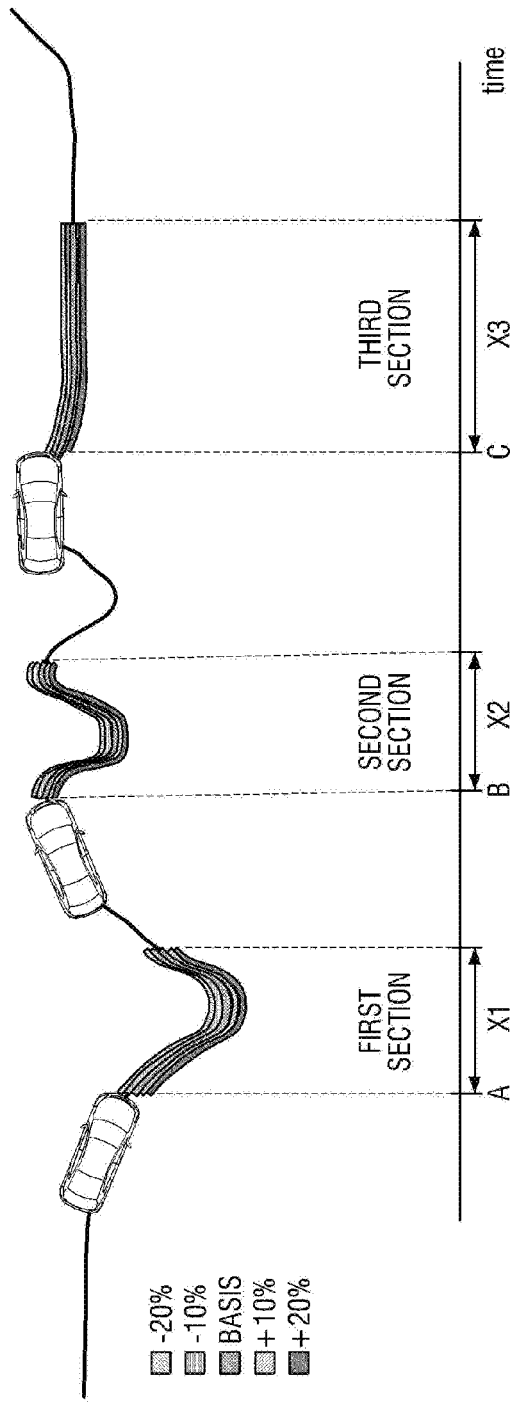
FIG. 4 is a diagram illustrating a state of controlling behavior of a vehicle during travelling according to the exemplary embodiment of the present disclosure.

FIG. 4 is a diagram illustrating a state of controlling the behavior of the vehicle during travelling according to the exemplary embodiment of the present disclosure.

In the case where it is necessary to control the behavior of the vehicle, the second comparing unit 36 calculates a vehicle route (hereinafter, referred to as an "expected route") for X time after the present time. The second comparing unit 36 estimates a third vehicle motion sickness index at each speed of the vehicle which is travelling the expected route while changing the speed of the vehicle. The second comparing unit 36 also estimates a third vehicle motion sickness index at a current speed as a matter of course. Herein, the third vehicle motion sickness index is defined as motion sickness causing energy generated by the behavior of the vehicle for X time after the present time. Herein, the process of estimating the third vehicle motion sickness index is the same as the process of estimating the first vehicle motion sickness index, so that detailed contents thereof will be omitted.

The second comparing unit 36 controls the vehicle to travel at a speed having the smallest third vehicle motion sickness index among the third vehicle motion sickness indexes estimated in the respective speeds. Referring to FIG. 4, the second comparing unit 36 estimates the third vehicle motion sickness index at each speed while changing the speed of the vehicle in five stages. The second comparing unit 36 calculates an expected route (a first section) for X1 time after the present time when the vehicle is in location A, and then estimates the third vehicle motion sickness index at each speed, and controls the vehicle to travel at a speed having the smallest third vehicle motion sickness index. Then, even when the vehicle is in locations B and C, the second comparing unit 36 controls the vehicle by the same method. In the meantime, in FIG. 4, the speed of the vehicle is changed in five stages, but the speed of the vehicle may be set with five stages or above or below.

In the meantime, in another exemplary embodiment of the present disclosure in relation to the control of the behavior of the vehicle, the second comparing unit 36 may also estimate the third vehicle motion sickness index while changing a direction of the vehicle in the expected route.

Figure 5:
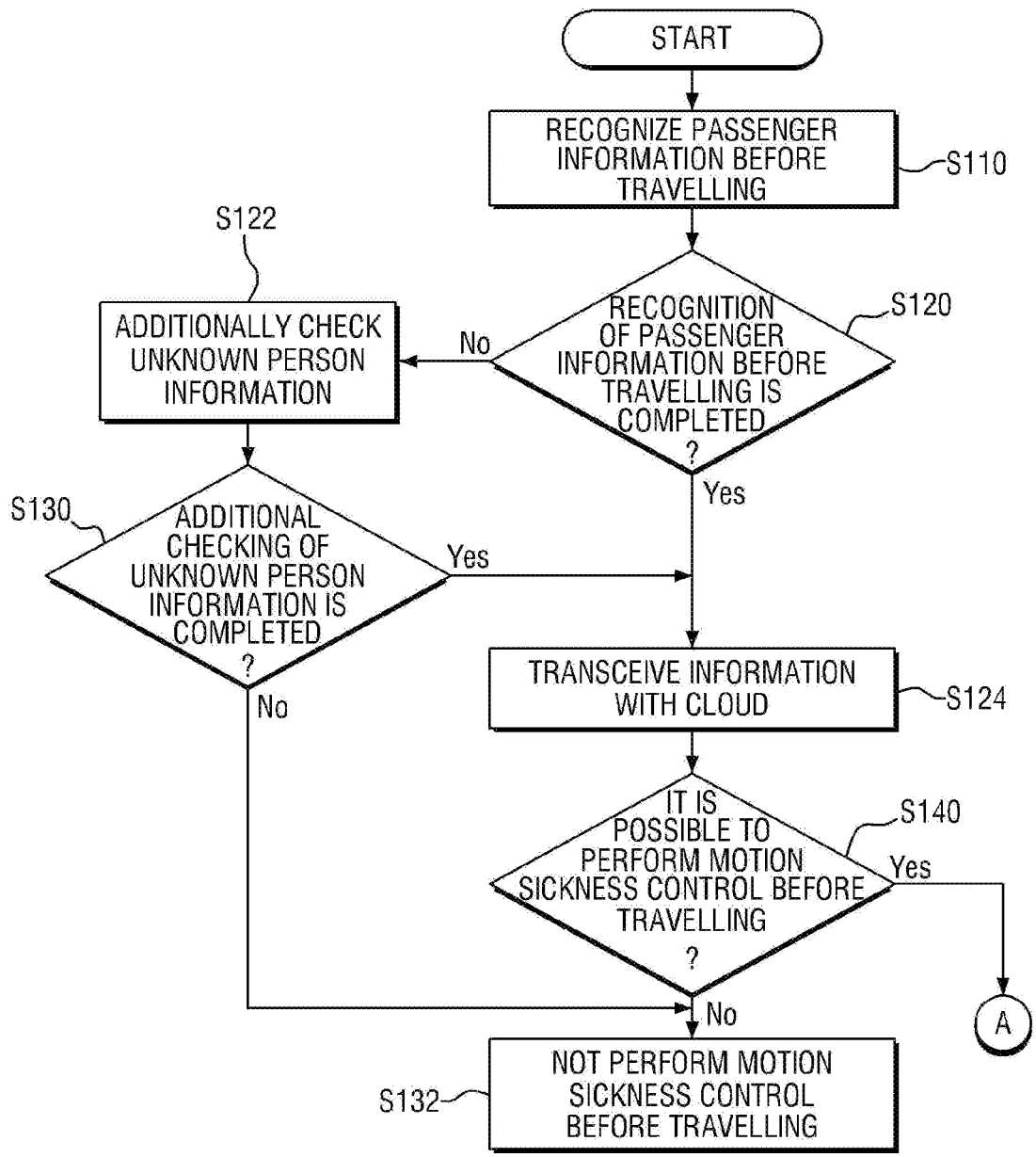
FIG. 5 is a flowchart illustrating a preliminary determination on whether it is possible to control motion sickness before travelling according to the exemplary embodiment of the present disclosure.
Figure 6:
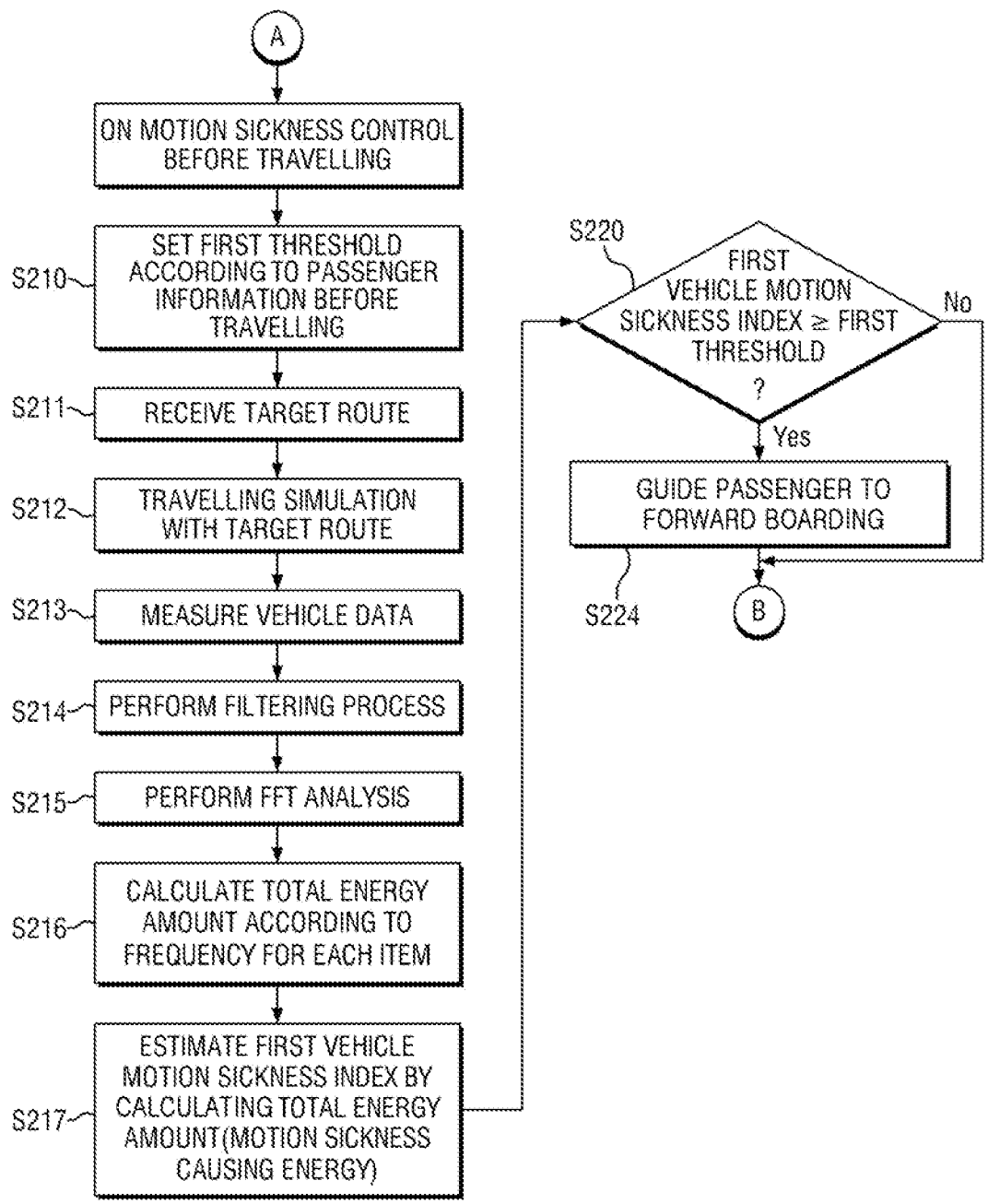
FIG. 6 is a flowchart illustrating a process of controlling motion sickness before travelling according to the exemplary embodiment of the present disclosure.
Figure 7:
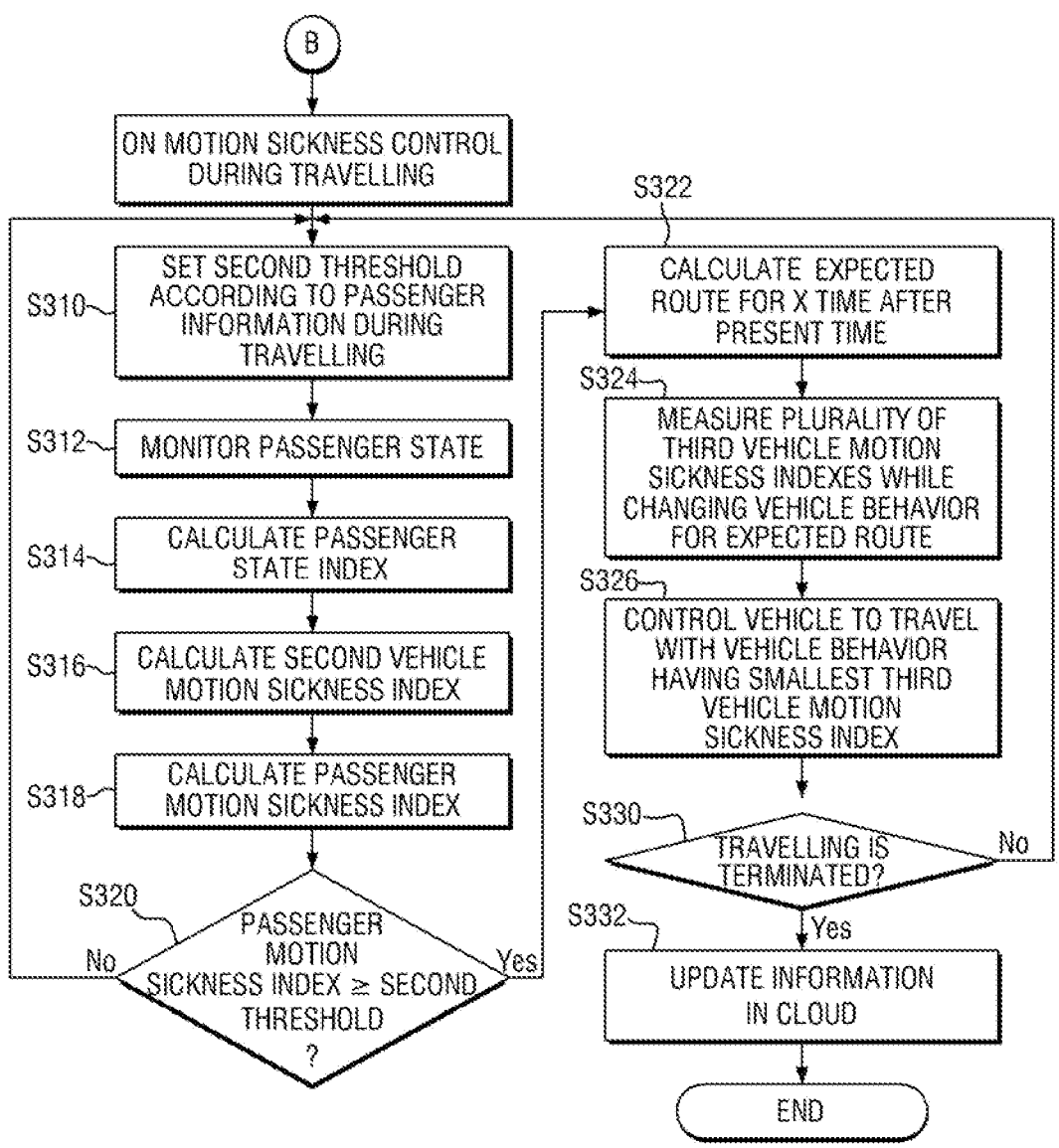
FIG. 7 is a flowchart illustrating a process of controlling motion sickness during travelling according to the exemplary embodiment of the present disclosure.

FIG. 5 is a flowchart illustrating a preliminary determination on whether it is possible to control motion sickness before travelling according to the exemplary embodiment of the present disclosure, FIG. 6 is a flowchart illustrating a process of controlling motion sickness before travelling according to the exemplary embodiment of the present disclosure, and FIG. 7 is a flowchart illustrating a process of controlling motion sickness during travelling according to the exemplary embodiment of the present disclosure.

Hereinafter, a process of operating the system for controlling an autonomous vehicle for reducing motion sickness according to the exemplary embodiment of the present disclosure will be described with reference to FIGS. 5 to 7.

As illustrated in FIG. 5, the motion sickness control preliminary determining unit 10 receives passenger information before travelling through the sensor unit 40 or the cloud 50 (S110), and determines whether all of the passenger information is recognized (S120). When there is a person of which the passenger information is not recognized, the motion sickness control preliminary determining unit 10 classifies the person into an unknown person (S122) and then determines whether the passenger information about the unknown person before travelling is recognized (S130), and when the passenger information about the unknown person before travelling is not recognized, the motion sickness control preliminary determining unit 10 does not control the motion sickness before the travelling (S132). When all of the passenger information about the passenger before the travelling is recognized, the motion sickness control preliminary determining unit 10 transmits the passenger information before the travelling to the cloud 50 (S124). Accordingly, even when the passenger boards another vehicle, personal information about the passenger may be used through the cloud 50. Further, the passenger information before the travelling is stored in a memory unit (not illustrated) of a vehicle which the passenger often boards, so that motion sickness-related information may be more stably collected. Then, the motion sickness control preliminary determining unit 10 determines whether it is possible to control the motion sickness before the travelling (S140).

As illustrated in FIG. 6, when it is possible to control the motion sickness before the travelling, the first threshold setting unit 22 sets a first threshold according to the passenger information before the travelling (S210). Then, the first vehicle motion sickness index estimating unit 24 receives a target route through a navigation system and the like (S211), performs a travelling simulation according to the target route (S212), filters the measured vehicle data with a frequency band of interest (S14) and performs an FFT analysis (S215), and computes energy for each vehicle data item (S216), and then estimates a first vehicle motion sickness index (S217). When the first vehicle motion sickness index is larger than the first threshold (S220), the first comparing unit 26 controls the vehicle to guide a boarding location of the passenger to a location at which a vehicle motion is predictable, for example, a forward boarding location (S224).

As illustrated in FIG. 7, when the control of the motion sickness is completed before the travelling and then the travelling starts, the second threshold setting unit 32 sets a second threshold according to passenger information during travelling (S310). Then, the passenger motion sickness index calculating unit 34 receives information obtained by sensing passenger state information in real time through the sensor unit 40 (S312), and calculates a passenger state index (S314). Then, the passenger motion sickness index calculating unit 34 receives information obtained by sensing vehicle state information in real time through the sensor unit 40 and calculates a second vehicle motion sickness index (S316). Then, the passenger motion sickness index calculating unit 34 calculates a passenger motion sickness index by computing the passenger state index and the second vehicle motion sickness index (S318). When the passenger motion sickness index is larger than the second threshold (S320), the second comparing unit 36 calculates an expected route for X time after a present time through the navigation system and the like (S322), and estimates a third vehicle motion sickness index according to each vehicle behavior while changing a behavior, such as a speed and a direction, of the vehicle which is to move along the expected route (S324). Herein, the second comparing unit 36 controls the vehicle to travel the expected route with the behavior of the vehicle having the smallest third vehicle motion sickness index (S326). Then, when the travelling is terminated (S330), each information estimated or calculated in the foregoing process is stored in the cloud 50 (S332) or the memory unit (not illustrated).

While this disclosure has been described in connection with the limited exemplary embodiments and drawings, the disclosure is not limited thereto, and it is obvious that various changes and modifications within the technical spirit of the present disclosure and the scope equivalent to the scope of the appended claims may be made by those skilled in the art.

What is claimed is:

1. A system for controlling an autonomous vehicle for reducing motion sickness, the system comprising:
    a sensor unit configured to:
        detect information about environments inside and outside the autonomous vehicle; and
        recognize information about a passenger and information on behavior of the autonomous vehicle;
    a cloud configured to store the information collected by the sensor unit;
    a motion sickness control preliminary determining unit configured to:
        receive the information about the passenger before travelling; and
        determine whether to control motion sickness before travelling in advance by using the information about the passenger before travelling;
    a first threshold setting unit configured to:
        set a first threshold indicating the level of sensitivity to the occurrence of the motion sickness of the passenger according to the passenger information before travelling; and
        store the first threshold in the cloud;
    a first vehicle motion sickness index estimating unit configured to:
        receive information about a target route from a departure point to a destination before travelling;
        perform a travelling simulation according to the target route; and
        estimate a first vehicle motion sickness index, wherein the first vehicle motion sickness index is defined as motion sickness causing energy generated by behavior of the autonomous vehicle while the travelling simulation is performed;
    a first comparing unit configured to:
        compare the first vehicle motion sickness index with the first threshold;
        determine as the occurrence of the motion sickness is not predicted when the first vehicle motion sickness index is smaller than the first threshold; and
        determine as the occurrence of the motion sickness is predicted when the first vehicle motion sickness index is larger than the first threshold, so that the first comparing unit generates a guide signal so as to guide the passenger to board the autonomous vehicle in a forward-facing direction rather than reverse-facing direction with respect to a direction of travel of the autonomous vehicle;
    a second threshold setting unit configured to set a second threshold indicating the degree of sensitivity to the occurrence of the motion sickness of the passenger according to the passenger information during the travelling;
    a passenger motion sickness index calculating unit, configured to:

calculate a passenger state index, wherein the passenger state index is computed by summing the degree of the occurrence of the motion sickness and each passenger state information to which a weighted value is assigned, and then dividing the summed value by a travelling time up to the present time;

estimate a second vehicle motion sickness index defined as motion sickness causing energy generated by the behavior of the autonomous vehicle for the travelling time up to the present time; and calculate a passenger motion sickness index quantifying the degree of occurrence of the motion sickness of the passenger during the travelling using the passenger state index and the second vehicle motion sickness index; and a second comparing unit configured to:

compare the second vehicle motion sickness index with the second threshold;

determine as the occurrence of the motion sickness does not occur when the second vehicle motion sickness index is smaller than the second threshold, so that it is not necessary to control the behavior of the autonomous vehicle; and determine as the occurrence of the motion sickness occurs when the second vehicle motion sickness index is larger than the second threshold, so that the second comparing unit is to control the behavior of the autonomous vehicle to reduce or eliminate the occurrence of a frequency of shaking or vibration of the autonomous vehicle causing the motion sickness.

2. The system of claim 1, wherein the passenger information before the travelling includes boarding location information of the passenger or vehicle movement prediction information of the passenger.

3. The system of claim 1, wherein:

the first vehicle motion sickness index estimating unit is configured to collect a vehicle data and analyze the vehicle data, and the vehicle data includes at least one of translational motion data in an X-axis direction of the autonomous vehicle, translational motion data in a Y-axis direction of the autonomous vehicle, translational motion data in a Z-axis direction of the autonomous vehicle, rotational motion data around the X-axis of the autonomous vehicle, rotational motion data around the Y-axis of the autonomous vehicle, or rotational motion data around the Z-axis of the autonomous vehicle.

4. The system of claim 1, wherein a degree of the body change of the passenger is divided into n stages.

5. The system of claim 1, wherein the passenger information during the travelling includes boarding location information of the passenger or vehicle movement prediction information of the passenger.

6. The system of claim 1, wherein the second comparing unit is configured to:

calculate an expected route as a vehicle route for X time after the present time;

estimate a third vehicle motion sickness index defined as motion sickness causing energy generated by the behavior of the autonomous vehicle at each speed of the autonomous vehicle which is travelling the expected route while changing the speed of the autonomous vehicle; and control the autonomous vehicle to travel at a speed having the smallest third vehicle motion sickness index among the third vehicle motion sickness indexes estimated in the respective speeds.

7. The system of claim 1, wherein:

when the travelling of the autonomous vehicle is terminated, the passenger motion sickness index is transmitted to the cloud, and the cloud is configured to store the passenger motion sickness index.

* * * * *